United States Patent
Dong et al.

(10) Patent No.: US 12,095,051 B2
(45) Date of Patent: Sep. 17, 2024

(54) BATTERY PACK AND ELECTRICAL DEVICE

(71) Applicant: CONTEMPORARY AMPEREX TECHNOLOGY CO., LIMITED, Ningde (CN)

(72) Inventors: Miaomiao Dong, Ningde (CN); Shaocong Ouyang, Ningde (CN); Huan Ni, Ningde (CN); Hongyu Liu, Ningde (CN); Changfeng Bie, Ningde (CN); Xin Sun, Ningde (CN); Chenghua Fu, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/384,675

(22) Filed: Oct. 27, 2023

(65) Prior Publication Data

US 2024/0088460 A1    Mar. 14, 2024

Related U.S. Application Data

(63) Continuation of application No. PCT/CN2022/108603, filed on Jul. 28, 2022.

(51) Int. Cl.
*H01M 10/44* (2006.01)
*H01M 4/02* (2006.01)
(Continued)

(52) U.S. Cl.
CPC ......... *H01M 10/443* (2013.01); *H01M 4/136* (2013.01); *H01M 4/364* (2013.01);
(Continued)

(58) Field of Classification Search
None
See application file for complete search history.

(56) References Cited

U.S. PATENT DOCUMENTS

| | | | |
|---|---|---|---|
| 2017/0077518 A1* | 3/2017 | Nishide | ............ C07C 50/04 |
| 2018/0151925 A1 | 5/2018 | Yoshida et al. | |

FOREIGN PATENT DOCUMENTS

| | | | | |
|---|---|---|---|---|
| CN | 103022496 A | * | 4/2013 | |
| CN | 103985917 A | * | 8/2014 | .......... H01M 10/443 |

(Continued)

OTHER PUBLICATIONS

The World Intellectual Property Organization (WIPO) International Search Report and Written opinion for PCT/CN2022/108603 Jan. 30, 2023 16 pages (including English translation).

*Primary Examiner* — Robert S Carrico

(74) *Attorney, Agent, or Firm* — ANOVA LAW GROUP, PLLC

(57) ABSTRACT

A battery pack includes a first battery cell, a second battery cell, and a third battery cell. A positive electrode active substance of each battery cell is composed of lithium iron phosphate and a low-temperature additive. The low-temperature additive is selected from compounds containing at least two carbonyl groups, which are conjugated with an unsaturated structure or an atom having lone-pair electrons connected with the carbonyl groups, and a discharging cut-off voltage of the battery pack at a low temperature has the following rules: discharging cut-off voltages V1, V2, and V3 of the first battery cell, second battery cell, and third battery cell range from 1.95V to 2.1V, from 1.8 V to 2.0V, from 1.6V to 1.9V, respectively, and V1, V2, and V3 satisfy a relationship of V1>V2>V3.

14 Claims, 4 Drawing Sheets

(51) Int. Cl.
    *H01M 4/136*     (2010.01)
    *H01M 4/36*     (2006.01)
    *H01M 4/58*     (2010.01)
    *H01M 4/60*     (2006.01)
    *H01M 10/0525*     (2010.01)
    *H01M 10/42*     (2006.01)
    *H01M 50/249*     (2021.01)

(52) U.S. Cl.
    CPC ............ *H01M 4/5825* (2013.01); *H01M 4/60* (2013.01); *H01M 10/0525* (2013.01); *H01M 10/4235* (2013.01); *H01M 10/441* (2013.01); *H01M 50/249* (2021.01); *H01M 2004/028* (2013.01)

(56) References Cited

FOREIGN PATENT DOCUMENTS

| | | | |
|---|---|---|---|
| CN | 111711231 A | | 9/2020 |
| JP | 2007188715 A | * | 7/2007 |
| JP | 2007188715 A | | 7/2007 |
| WO | 2022133959 A1 | | 6/2022 |

\* cited by examiner

BATTERY PACK AND ELECTRICAL DEVICE

CROSS-REFERENCE TO RELATED APPLICATION

This application is a continuation of International Application No. PCT/CN2022/108603, filed on Jul. 28, 2022, the entire content of which is incorporated herein by reference.

FIELD

The present disclosure relates to the field of lithium-ion batteries, and more particularly, to a battery pack having a high energy retention rate at a low temperature and an electrical device including the battery pack.

BACKGROUND

In recent years, with continuous development of the lithium-ion battery technology, the lithium-ion battery is widely applied to energy storage power supply systems such as water power, firepower, wind power and solar power stations, and a plurality of fields such as electric tools, electric bicycles, electric motorcycles, electric vehicles, military equipment, aerospace and the like.

In the above fields, sometimes a capacity of a lithium-ion secondary battery cell cannot meet the use requirements. In this case, it is required to connect a plurality of the lithium-ion secondary battery cells in series or in parallel to form a battery pack, so as to improve an overall discharging capacity of the battery pack.

However, when the battery pack composed of the lithium-ion secondary battery cells is used in a low-temperature environment such as winter, an energy retention rate is greatly reduced, that is, an endurance at a low temperature seriously deteriorates. Thus, it is an urgent to improve the endurance of the entire battery pack at a low temperature.

SUMMARY

In view of the above-mentioned technical problem, the present disclosure aims to provide a battery pack composed of lithium-ion secondary batteries, which has an excellent energy retention rate at a low temperature and an improved endurance at a low temperature, and an electrical device including the battery pack.

In order to achieve the above object, a first aspect of the present disclosure provides a battery pack, including a battery pack case and battery cells accommodated in the battery pack case. The battery pack is characterized in that, based on a determined temperature distribution in entire internal space of the battery pack case when being applied at a low temperature, the internal space of the battery pack case includes a first region, a second region, and a third region in a descending order of temperature; a first battery cell is arranged in the first region, a second battery cell is arranged in the second region, a third battery cell is arranged in the third region, the first battery cell and the second battery cell are arranged adjacent to each other, and the second battery cell and the third battery cell are arranged adjacent to each other; the internal space of the battery pack case includes one or more first regions, second regions, and/or third regions; a positive electrode of each of the first battery cell, second battery cell, and third battery cell includes a positive electrode active substance, the positive electrode active substance being composed of lithium iron phosphate and a low-temperature additive, the low-temperature additive being selected from one or more of compounds containing at least two carbonyl groups that are respectively or jointly conjugated with a double bond, an unsaturated monocyclic ring or unsaturated fused ring, an unsaturated group, and an atom having lone-pair electrons connected thereto; and a discharging cut-off voltage of the battery pack at temperatures of 10° C. and below has the following rules: a discharging cut-off voltage V1 of the first battery cell in the first region ranges from 1.95V to 2.1V, a discharging cut-off voltage V2 of the second battery cell in the second region ranges from 1.8V to 2.0V, a discharging cut-off voltage V3 of the third battery cell in the third region ranges from 1.6V to 1.9V, and V1, V2, and V3 satisfy a relationship of V1>V2>V3.

In the present disclosure, the temperature distribution of the internal space of the battery pack can be determined through a simulation method, and then the internal space of the battery pack case is divided into regions in a direction from the highest temperature to the lowest temperature. As an example, the temperature distribution of the internal space of the battery pack can be determined through the simulation method by using an ANSYS-SCDM software (Beijing Huanzhong Ruichi Technology Co., Ltd.). The method includes the following steps: (1) performing battery low-temperature (lower than or equal to 10° C.) working condition testing, and recording a current magnitude, a battery resistance, and working condition process parameters; and (2) inputting, into the ANSYS-SCDM software, a three-dimensional structure digital model of the battery pack, a material heat conduction coefficient, a water-cooling system structure, a water-cooling flow speed, and a water-cooling temperature, to calculate heat production and heat dissipation balance of the interior of the battery pack, thereby obtaining temperature distributions at different time and different positions.

In some embodiments, based on the determined temperature distribution in the entire internal space of the battery pack case when being applied at the low temperature, for the first region, the second region, and the third region, a difference between the highest temperature and the lowest temperature in the same region is greater than or equal to 3° C., and optionally lower than or equal to 10° C. Optionally, the highest temperature of the third region is lower than or equal to the lowest temperature of the second region, and the highest temperature of the second region is lower than or equal to the lowest temperature of the first region.

When a difference between the highest temperature and the lowest temperature in the space of the battery pack case is smaller than 3° C., the internal space may not be divided into regions. Based on experience, it can be known that a temperature difference value smaller than 3° C. in the same region has little influence on the discharging capacity of the battery in the same region.

In some embodiments, in the entire internal space of the battery pack case, the highest temperature $T_H$, the lowest temperature $T_L$, and $T_H-T_L=T_M$ in the internal space of the battery pack case are determined when being applied at low temperature, in the first region, the highest temperature is $T_H$, and the lowest temperature is $T_1=T_H-(T_M/3)$; in the second region, the highest temperature is $T_1$, and the lowest temperature is $T_2=T_H-2(T_M/3)$; and in the third region, the highest temperature is $T_2$, and the lowest temperature is $T_L$, where $3°\text{ C.}\leq T_M/3\leq 10°\text{ C.}$ Therefore, the internal region of the space of the battery pack case can be better divided, and such a division manner enable the battery pack to be better adapt to the low-temperature environment.

The compound containing at least two carbonyl groups that are conjugated with unsaturated atoms, groups or structures connected thereto has excellent electrochemical oxidation-reduction properties in a voltage range suitable for itself, and it has a relatively gentle voltage platform between 1.9 V to 2.9 V. Thus, by mixing a proper amount of the compound in a lithium iron phosphate system, the decrease of a discharging voltage of the cell can be alleviated when the voltage of the battery cell decays rapidly (below 3V) at the end of the discharging process, thereby prolonging the discharging process and improving a discharging power performance of the battery.

When the battery pack is practically applied at a low temperature, a temperature of an outer ring (the third region or the second region) of the battery pack is low, and a temperature of an inner ring (the first region or the second region) is high, such that the battery cells in the outer ring have shorter discharging time, smaller discharging capacity, and worse power performance. By setting a cut-off voltage of the outer ring to be lower, the battery pack can release more energy under the same condition, to make up for the difference in cell discharge of the battery pack caused by temperature rise, thereby improving the overall discharging capacity of the battery pack, and meanwhile, further improving the power and discharge performance of the battery pack.

In some embodiments, V1, V2, and V3 satisfy 0.03V≤V1−V2≤0.3V, and 0.03V≤V2−V3≤0.3V In this way, through setting the discharging cut-off voltages of the first battery cell, second battery cell, and third battery cell as described above, the energy released by the first battery cell, the second battery cell, and the third battery cell at the low temperature can be substantially consistent, thereby improving the energy retention rate of the entire battery pack at the low temperature.

In some embodiments, a theoretical gram capacity of the compound, which may serve as the low-temperature additive, is in a range from 150 mAh/g to 800 mAh/g, and optionally in a range from 180 mAh/g to 600 mAh/g. In this way, by using the low-temperature additive having the theoretical gram capacity within the above-mentioned ranges, it can be ensured that each battery cell has enough energy density, thereby improving the low-temperature discharging power of each battery cell and the overall battery pack.

In some embodiments, an overall gram capacity of the positive electrode active substance of the first battery cell ranges from 136 mAh/g to 154 mAh/g, an overall gram capacity of the positive electrode active substance of the second battery cell ranges from 133 mAh/g to 163 mAh/g, and an overall gram capacity of the positive electrode active substance of the third battery cell ranges from 128 mAh/g to 172 mAh/g. In this way, when the overall gram capacities of the positive electrode active substance of the first battery cell, second battery cell, and third battery cell are respectively within the above ranges, the discharging capacities of the first battery cell, second battery cell, and third battery cell at the low temperature can be substantially consistent, thereby improving the energy retention rate of the entire battery pack 1 at the low temperature.

In some embodiments, the compound that can be used as low-temperature additive has a relative molecular weight in a range from 100 to 800.

In some embodiments, the low-temperature additive is selected from the group consisting of simple quinones, substituted quinones, quinones fused with heterocycles, polycarbonyl quinones, cyclic dianhydrides or cyclic diimides fused with unsaturated rings and salts thereof, substituted or unsubstituted six-membered rings containing 3 or 4 carbonyl groups and 2 or 3 atoms having lone-pair electrons, alkoxides of a six-membered ring containing 2 to 4 carbonyl groups and 1 to 2 double bonds and containing no heterocyclic atoms, and carboxylates containing a benzene ring or a double bond that is conjugated with the at least two carbonyl groups. Optionally, the low-temperature additive is selected from one or more of 1,4-dibenzoquinonyl benzene, p-benzoquinone, o-benzoquinone, anthraquinone, phenanthrenequinone, 2,3,5,6-tetrahydro-1,4-benzoquinone, 2,5-dimethoxybenzoquinone, 1,3,4-trihydroxyanthraquinone, 1,5-dilithiumoxyanthraquinone, dipyrido p-benzoquinone, dipyrido o-benzoquinone, dithieno p-benzoquinone, dithieno o-benzoquinone, difurano p-benzoquinone, nonbenzohexaquinone, 5,7,12,14-pentacene tetraquinone, pyromellitic dianhydride, naphthalenetetracarboxylic dianhydride, perylene tetracarboxylic dianhydride, dichloroisocyanuric acid, unsubstituted or $C_{1-6}$ alkyl- or $C_{1-6}$ alkenyl-substituted piperazine tetrone derivatives, 2,5-dihydroxybenzoquinone dilithium salt, dilithium rhodizonate, tetra-lithium rhodizonate, lithium terephthalate, lithium 2,4-dienyladipate, lithium vinyl dibenzoate, lithium diimide benzenetetracarboxylate, or dilithium diimide naphthalenetetracarboxylate.

The low-temperature additive described above has a reversible charging and discharging platform, and after it partially replaces the lithium iron phosphate, it can relieve the attenuation of the voltage through an auxiliary effect of the reversible charging and discharging platform when the battery is discharged at a low SOC, thereby enhancing the discharging power performance of the cell.

In some embodiments, in the positive electrode of each of the first battery cell, the second battery cell, and the third battery cell, a mass ratio of the low-temperature additive ranges from 0% to 13%, calculated based on a total mass of the positive electrode active substance. If the mass ratio of the low-temperature additive is greater than 13%, lithium supplementing amount in the corresponding negative electrode may be excessively great due to the excessively high mass ratio of the low-temperature additive, thereby resulting in a production safety risk.

In some alternative embodiments, in the positive electrode of the first battery cell, a mass ratio of the low-temperature additive ranges from 0% to 2%, calculated based on a total mass of the active substance, in the positive electrode of the respective second battery cell, a mass ratio of the low-temperature additive ranges from 2% to 8%, calculated based on a total mass of the active substance, and in the positive electrode of the respective third battery cell, a mass ratio of the low-temperature additive ranges from 8% to 13%, calculated based on a total mass of the active substance.

Therefore, when the mass ratios of the low-temperature additive in the first battery cell, the second battery cell, and the third battery cell are within the above-mentioned ranges, the discharging time of the first battery cell, second battery cell, and third battery cell can be better balanced and kept consistent as much as possible, thereby further improving the low-temperature energy retention rate and the power performance of the overall battery pack.

In some embodiments, at a temperature below 10° C., when a sum of a discharging capacity corresponding to a discharging voltage platform of the lithium iron phosphate and a discharging capacity of a discharging voltage platform of the low-temperature additive is 100%: a discharging capacity ratio corresponding to the discharging voltage platform of the low-temperature additive of the third battery cell is greater than a discharging capacity ratio corresponding to the discharging voltage platform of the low-temperature additive of the second battery cell; and the discharging capacity ratio corresponding to the discharging voltage platform of the low-temperature additive of the second battery cell is greater than a discharging capacity ratio corresponding to the discharging voltage platform of the low-temperature additive of the first battery cell.

The battery cells with different low-temperature energy retention rates, which have each a discharging voltage platform of the lithium iron phosphate with higher discharging voltage and a discharging voltage platform of the low-temperature additive with lower discharging voltage, are respectively disposed in different regions of the battery pack case, and the battery cells with higher low-temperature energy retention rate are disposed in the region having lower temperature. Specifically, for example, by means of a region division manner in FIG. 2, based on the temperature distribution of the interior of the battery pack when being applied at a low temperature, the temperature of the first region R1>the temperature of the second region R2>the temperature of the third region R3. In the present disclosure, the discharging capacity ratio corresponding to the discharging voltage platform of the low-temperature additive of the third battery cell 63>the discharging capacity ratio corresponding to the discharging voltage platform of the low-temperature additive of the second battery cell 62>the discharging capacity ratio corresponding to the discharging voltage platform of the low-temperature additive of the first battery cell 61. In this way, for example, at a low temperature, the third battery cell 63, as being disposed in a lower temperature environment, firstly completes the discharging by using the discharging voltage platform of lithium iron phosphate and begins the supplementary discharging by using the discharging voltage platform of the low-temperature additive. At this moment, the first battery cell and the second battery cell are still in the process of discharging by using the discharging voltage platform of the lithium iron phosphate. In this way, these three battery cells discharge together to ensure that the energy retention rate of the entire battery pack in a low-temperature environment is at a relatively high level. When the second battery cell completes the discharging by using the discharging voltage platform of lithium iron phosphate and begins the supplementary discharging by using the discharging voltage platform of the low-temperature additive, the third battery cell is still in the discharging process by using the discharging voltage platform of the low-temperature additive, and the first battery cell is still in the discharging process by using the discharging voltage platform of the lithium iron phosphate. In this way, these three battery cells still discharge together to ensure that the energy retention rate of the entire battery pack in the low-temperature environment is at a relatively high level. Therefore, by further adjusting the discharging capacity ratio corresponding to the discharging voltage platform of the low-temperature additive of each of the first battery cell, second battery cell, and third battery cell, a battery pack with higher overall low-temperature energy retention rate can be obtained, which remarkably improves the low-temperature energy retention rate of the battery pack under a low-temperature condition in winter.

In some embodiments, when the positive electrode of each of the first battery cell, second battery cell, and third battery cell includes the same positive electrode active substance, a mass ratio of the low-temperature additive in the positive electrode of the first battery cell≤a mass ratio of the low-temperature additive in the positive electrode of the second battery cell≤a mass ratio of the low-temperature additive in the positive electrode of the third battery cell. Optionally, the mass ratio of the low-temperature additive in the positive electrode of the first battery cell<the mass ratio of the low-temperature additive in the positive electrode of the second battery cell<the mass ratio of the low-temperature additive in the positive electrode of the third battery cell. The mass ratio of the low-temperature additive is calculated based on a total mass of the positive electrode active substance.

When the same low-temperature additive is used in each battery cell, with an increase in the mass ratio of the low-temperature additive, the discharging voltage platform of which is used for generating a lower discharging voltage, the discharging capacity ratio corresponding to the discharging voltage platform of the low-temperature additive is increased, and the low-temperature energy retention rate of the battery cell is enhanced.

In some embodiments, at a room temperature, optionally, at 25° C.: a discharging capacity of a single cell of the first battery cell>a discharging capacity of a single cell of the second battery cell>a discharging capacity of a single cell of the third battery cell. In this way, when the discharge capacities of the respective single cells of the first battery cell, second battery cell, and third battery cell satisfy the above relationship, in particular, when the discharging capacities of the first battery cell, second battery cell, and third battery cell measured at a room temperature satisfy the above relationship, the energy retention rate of the entire battery pack at a low temperature can be further improved.

A second aspect of the present disclosure provides a method for arranging a battery pack including a battery pack case and battery cells accommodated in the battery pack case. The method includes: step 1 of determining, based on a simulation method, a temperature distribution in entire internal space of the battery pack case when being applied at a low temperature; step of dividing, based on the temperature distribution determined in the step 1, the internal space of the battery pack case into three regions in a descending order of temperature; step 3 of arranging a first battery cell in the first region, arranging a second battery cell in the second region, and arranging a third battery cell in the third region, allowing the first battery cell and the second battery cell to be arranged adjacent to each other, and the second battery cell and the third battery cell to be arranged adjacent to each other; and step 4 of designing a discharging cut-off voltage of the battery pack at a temperature of 10° C. and below based on following rules: a discharging cut-off voltage V1 of the first battery cell of the first region ranges from 1.95V to 2.1V, a discharging cut-off voltage V2 of the second battery cell in the second region ranges from 1.8V to 2.0V, a discharging cut-off voltage V3 of the third battery cell in the third region ranges from 1.6 V to 1.9V, and V1, V2, and V3 satisfy a relationship of V1>V2>V3, and optionally, 0.03V≤V1−V2≤0.3V, and 0.03V≤V2−V3≤0.3V. The internal space of the battery pack case includes one or more first regions, second regions, and/or third regions. A positive electrode of each of the first battery cell, the second battery cell, and the third battery cell includes a positive electrode active substance. The positive electrode active substance is composed of lithium iron phosphate and a low-temperature additive. The low-temperature additive is selected from one or more of compounds containing at least two carbonyl groups, which are respectively conjugated with a double bond, an unsaturated monocyclic ring or unsaturated fused ring, an unsaturated group, and an atom having lone-pair electrons connected thereto.

Electrical Device

A third aspect of the present disclosure provides an electrical device including the battery pack according to the first aspect of the present disclosure. The battery pack can be used as a power supply of the electrical device and can also be used as an energy storage unit of the electrical device. The electrical device may include a mobile device (such as a mobile phone, a notebook computer, etc.), an electric vehicle (such as a pure electric vehicle, a hybrid electric vehicle, a plug-in hybrid electric vehicle, an electric bicycle, an electric scooter, an electric golf cart, an electric truck, etc.), an electric train, a ship, a satellite, an energy storage system, etc., but it is not limited thereto.

For the electrical device, the battery cell or the battery pack can be selected according to its use requirements.

FIG. 4 is an example of an electrical device. The electrical device may be a pure electric vehicle, a hybrid electric vehicle, or a plug-in hybrid electric vehicle, etc. In order to meet the requirement of the electrical device for an endurance at a low temperature, the battery pack of the present disclosure can be used.

DESCRIPTION OF REFERENCE NUMERALS IN THE DRAWINGS

Figure 1:
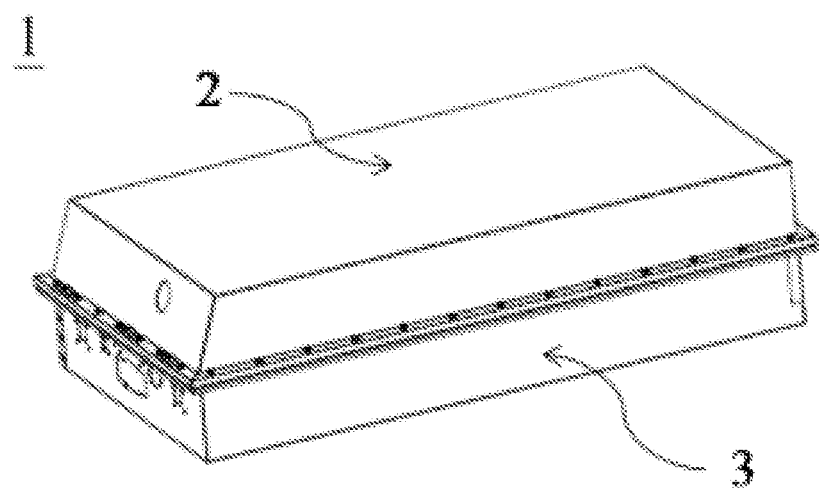
FIG. 1 is a structural schematic diagram of a battery pack according to an embodiment of the present disclosure.

1 battery pack; 2 upper case; 3 lower case; g1, g2 gaps; BL1 first boundary line; BL2 second boundary line; BL3 third boundary line; R1 first region; R2 second region; R3 third region; 61 first battery cell; 62 second battery cell; 63 third battery cell.

DETAILED DESCRIPTION

Embodiments of a battery pack and an electrical device of the present disclosure are described in detail below with appropriate reference to the detailed description of the accompanying drawings. However, unnecessary detailed description may be omitted. For example, there is a case of omitting a detailed description of well-known items and a repeated description of an actually same structure. This is to avoid unnecessarily lengthy of the following description, thereby helping those skilled in the art to understand. In addition, the accompany drawings and the following description are provided to make those skilled in the art to fully understand the present disclosure, which is not intended to limit the subject matter recited in the claims.

The "range" disclosed in the present disclosure is defined by a lower limit and an upper limit, and a given range is defined by selecting one lower limit and one upper limit, while the selected lower limit and upper limit define the boundaries of a particular range. A range defined in such a manner may include or not include the end values, which may be arbitrarily combined. That is, any lower limit may be combined with any upper limit to form a range. For example, if ranges of 60 to 120 and 80 to 110 are specified for a particular parameter, it can be understood that ranges of 60 to 110 and 80 to 120 are also expected for such a parameter. Further, if the minimum range values 1 and 2 are listed and the maximum range values 3, 4, and 5 are listed, all the following ranges may be expected: 1 to 3, 1 to 4, 1 to 5, 2 to 3, 2 to 4, and 2 to 6. In the present disclosure, unless otherwise stated, a numerical range of "a to b" means an abbreviated representation of a combination of any real numbers between a to b, where a and b are both real numbers. For example, a numerical range "0 to 5" means that all real numbers between 0 and 5 are all listed herein, and "0 to 5" is merely an abbreviated representation of combinations of these numbers. In addition, when it is recited that a certain parameter is an integer which is more than or equal to 2, it is equivalent to disclosing that the parameter is, for example, an integer of 2, 3, 4, 5, 6, 7, 8, 9, 10, 11, or 12, etc. The numerical ranges of "a-b" and "a to b" are used synonymously.

All the embodiments and optional embodiments of the present disclosure may be combined with each other to form a new technical solution, unless otherwise stated.

All the technical features and optional technical features of the present disclosure may be combined with each other to form a new technical solution, unless otherwise stated.

All the steps of the present disclosure may be performed sequentially or may be performed randomly, and in some embodiments sequentially, unless otherwise stated. For example, the method includes steps (a) and (b), and this indicates that the method may include steps (a) and (b) performed sequentially or may include steps (b) and (a) performed sequentially. For example, when it is mentioned that the method may further include a step (c), it indicates that the step (c) may be added to the method in any order, for example, the method may include steps (a), (b), and (c), and it may also include steps (a), (c), and (b) or may include steps (c), (a), and (b).

The phrase "include" and "comprise" mentioned in the present disclosure represent an open type, unless otherwise stated. For example, the phrase "include" and "comprise" may indicate that other un-listed components may or may not be further included or comprised.

The term "or" is inclusive in the present disclosure, unless otherwise stated. For example, the phrase "A or B" means "A, B, or both A and B". More specifically, any of following conditions satisfy the condition "A or B": A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

The inventor notices that when the battery pack composed of the lithium-ion secondary battery cells is used in a low-temperature environment in winter, due to the fact that a heat dissipation capacity and a heat preservation effect of the battery cells are different at different positions in the battery pack, charging and discharging performance of the battery cells may be inconsistent at different positions. Specifically, when being used in a low-temperature environment, a battery cell located on an inner side in the battery pack has a relatively high temperature and a relatively good discharging performance at a low temperature, and a battery cell located on an outer side in the battery pack has a relatively low temperature and a relatively poor discharging performance at the low temperature. A difference of the discharging capacities of the battery cells at different parts in the battery pack at the low temperature results in a significant decrease in the energy retention rate of the entire battery pack at the low temperature.

Regarding the above-mentioned problems, the inventor carried out research repeatedly. The results indicate that the capacity retention rate of the entire battery pack at a low temperature can be improved by enabling the battery cell arranged in the region of a relatively low temperature to have a relatively low discharging voltage platform. The reason is in that, subsequent to the discharging of a relatively high discharging voltage platform, a relatively low discharging voltage platform can be continuously used for discharging, and thus the discharging performance of the battery cells at a low temperature is more excellent.

Therefore, a battery pack according to a first aspect of the present disclosure includes a battery pack case and battery cells accommodated in the battery pack case. The battery pack is characterized in that, based on a determined temperature distribution in entire internal space of the battery pack case when being applied at a low temperature, the internal space of the battery pack case comprises a first region, a second region, and a third region in a descending order of temperature; a first battery cell is arranged in the first region, a second battery cell is arranged in the second region, a third battery cell is arranged in the third region, the first battery cell and the second battery cell are arranged adjacent to each other, and the second battery cell and the third battery cell are arranged adjacent to each other; the internal space of the battery pack case includes one or more first regions, second regions, and/or third regions; a positive electrode of each of the first battery cell, second battery cell, and third battery cell includes a positive electrode active substance, the positive electrode active substance being composed of lithium iron phosphate and a low-temperature additive, the low-temperature additive being selected from one or more of compounds containing at least two carbonyl groups that are respectively or jointly conjugated with a double bond, an unsaturated monocyclic ring or unsaturated fused ring, an unsaturated group, and an atom having lone-pair electrons connected thereto; and a discharging cut-off voltage of the battery pack at temperatures of 10° C. and below has the following rules: a discharging cut-off voltage $V_1$ of the first battery cell in the first region ranges from 1.95V to 2.1V, a discharging cut-off voltage $V_2$ of the second battery cell in the second region ranges from 1.8V to 2.0V, a discharging cut-off voltage $V_3$ of the third battery cell in the third region ranges from 1.6V to 1.9V, and $V_1$, $V_2$, and $V_3$ satisfy a relationship of $V_1 > V_2 > V_3$.

In the present disclosure, the temperature distribution of the internal space of the battery pack can be determined through a simulation method, and then the internal space of the battery pack case is divided into regions in a direction from the highest temperature to the lowest temperature. Optionally, an interior of the battery pack case can be divided into two regions, three regions, or four regions, up to five regions, and optimally, three regions. In the present disclosure, only the case when it is divided into three regions is described in detail. However, it should be understood that it is also feasible to divide the internal space into two regions, four regions, five regions, or even six regions, as long as a cut-off voltage of an outer region (the n-th region) is lower than a cut-off voltage of an inner region (the (n−1)-th region, n is a natural number ranging from 2 to 6), which shall all fall within a concept range of the present disclosure.

As an example, the temperature distribution of the internal space of the battery pack can be determined through the simulation method by using an ANSYS-SCDM software (Beijing Huanzhong Ruichi Technology Co., Ltd.). The method includes the following steps: (1) performing battery low-temperature (lower than or equal to 10° C.) working condition testing, and recording a current magnitude, a battery resistance, and working condition process parameters; and (2) inputting, into the ANSYS-SCDM software, a three-dimensional structure digital model of the battery pack, a material heat conduction coefficient, a water-cooling system structure, a water-cooling flow speed, and a water-cooling temperature, to calculate heat production and heat dissipation balance of the interior of the battery pack, thereby obtaining temperature distributions at different time and different positions.

It should be noted that for the present disclosure, the method for determining the temperature distribution of the internal space of the battery pack is not limited to the simulation method. The concept of the present disclosure is made to solve the problems that discharging of the battery cells at different positions is different and an overall discharging capacity is reduced, which is caused by a difference between the temperature distributions in the interior of the battery pack during the practical application at a low temperature. Therefore, all methods capable of determining the temperature distribution of the interior of the battery pack in actual application scenes shall fall within the concept scope of the present disclosure.

It can be understood that the internal space of the battery pack case of the present disclosure may include one or more first region, one second region, and/or one third region, and optionally one first region, one second region, and/or one third region.

Taking the internal space of the battery pack case in a substantially rectangular shape as an example, the battery pack in the first aspect of the present disclosure is specifically explained below. However, the battery pack according to the present disclosure is not limited to that the internal space of the battery pack case is in a substantially rectangular shape.

Figure 2:
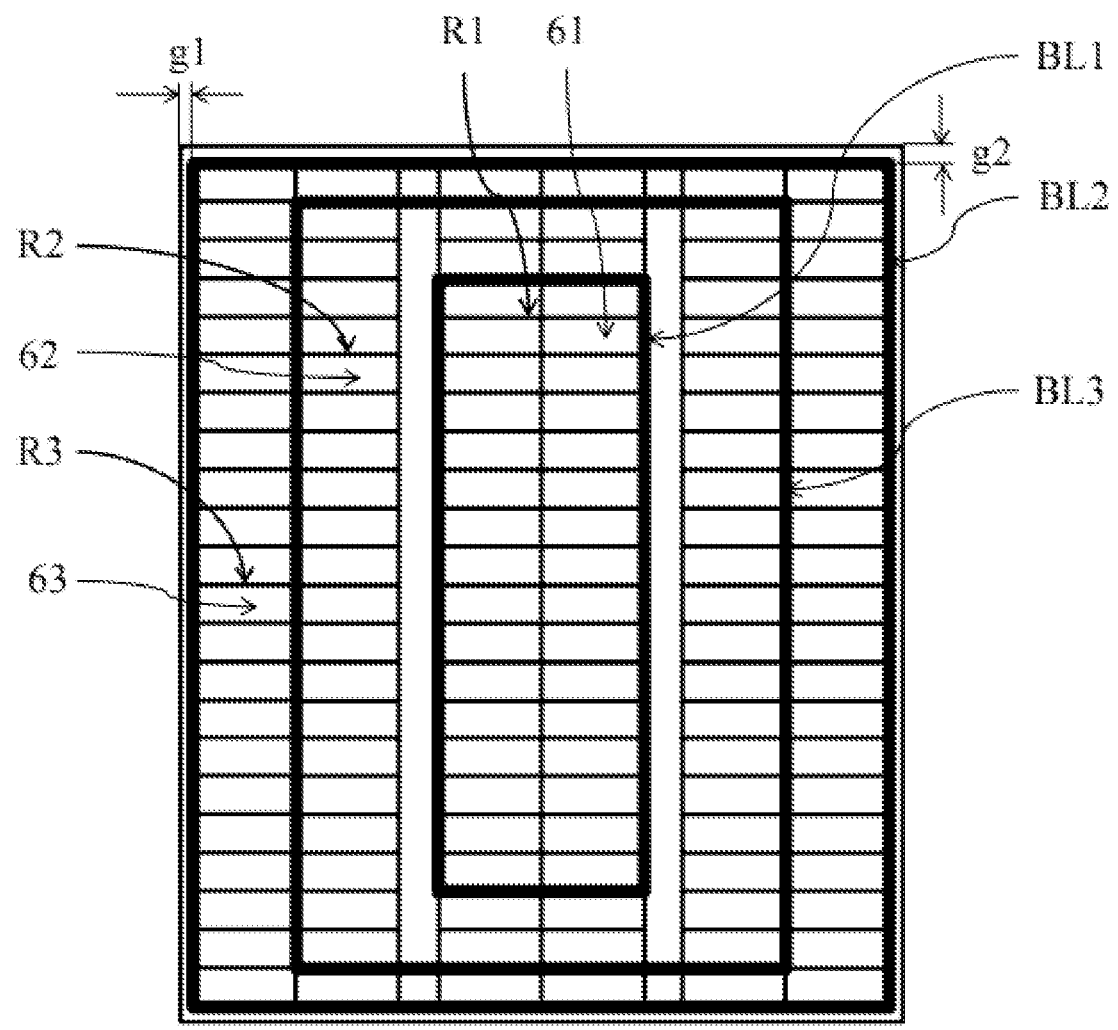
FIG. 2 is a top view of a structural assembly of the battery pack according to the embodiment of the present disclosure illustrated in FIG. 1, with a case being removed, when an internal space of the battery pack case is divided into three regions.

FIG. 1 is a structural schematic diagram of a battery pack 1 according to an embodiment of the present disclosure. FIG. 2 is a top view of a structural assembly of the battery pack according to the embodiment of the present disclosure illustrated in FIG. 1, with a case being removed, when an internal space of the battery pack case is divided into three regions.

As illustrated in FIG. 1 and FIG. 2, the battery pack 1 according to the present disclosure include a battery box and a plurality of battery cells (61, 62, 63) arranged in the battery box. The battery box includes an upper case 2 and a lower case 3, and the upper case 2 can cover the lower case 3 and define a closed space (a battery pack cavity) for accommodating the plurality of the battery cells.

When the internal space of the battery pack case is divided into three regions, as illustrated in FIG. 2, the internal space of the battery pack case includes a first region R1, a second region R2, and a third region R3. The first region R1 is a substantially rectangular region surrounded by a first boundary line BL1 and located at a center part of the rectangular shape of the internal space of the battery pack case (for example, a length and a width of a rectangular shape of the first region R1 can be approximately half of a length and a width of the rectangular shape of the internal space of the battery pack case). The second region R2 is a substantially annular region defined between the first boundary line BL1 and a third boundary line BL3. The third region R3 is a substantially annular region defined between a second boundary line BL2 and the third boundary line BL3. The first boundary line BL1, the second boundary line BL2, and the third boundary line BL3 are virtual lines drawn for clearly illustrating the first region R1, the second region R2, and the third region R3.

Further, a first battery cell 61 is disposed in the first region R1, a second battery cell 62 is disposed in the second region R2, a third battery cell 63 is disposed in the third region R3. The second battery cell 62 is arranged to surround a periphery of the first battery cell 61, and the third battery cell 63 is arranged to surround a periphery of the second battery cell 62.

As illustrated in FIG. 2, the battery cells located on an outer side in the plurality of the battery cells can be in contact with an inner surface of the battery pack case (the upper case 2 and the lower case 3), and they can also be in contact with a structural member arranged on the inner surface of the battery pack case. In the top view illustrated in FIG. 2, gap g1 and gap g2 are optionally formed between the outermost battery cells and the inner surface of the battery pack case, and various structural members of the battery pack may be arranged in the gap g1 and gap g2. In a void between different battery cells, a capacitor or the like can be optionally arranged, to improve an overall energy density of the battery pack.

In some embodiments, based on the determined temperature distribution in the entire internal space of the battery pack case when being applied at a low temperature, for the first region, the second region, and the third region, a difference between the highest temperature and the lowest temperature in the same region is greater than or equal to 3° C., and optionally lower than or equal to 10° C. Optionally, the highest temperature of the third region is lower than or equal to the lowest temperature of the second region, and the highest temperature of the second region is lower than or equal to the lowest temperature of the first region.

When the difference between the highest temperature and the lowest temperature in the space of the battery pack case is lower than 3° C., the internal space may not be divided into regions. Based on experience, it can be known that a temperature difference value smaller than 3° C. in the same region has little influence on the discharging capacity of the battery in the same region.

However, it should be understood that, although it is defined that the difference between the highest temperature and the lowest temperature in the same region is greater than or equal to 3° C., and optionally lower than or equal to 10° C. in the present disclosure, this solution is only a better option. The solutions, in which the difference between the highest temperature and the lowest temperature in the same region is lower than 3° C. or greater than 10° C., shall also fall within the concept range of the present disclosure.

In some embodiments, in the entire internal space of the battery pack case, the highest temperature $T_H$, the lowest temperature $T_L$, and $T_H-T_L=T_M$ in the internal space of the battery pack case are determined when being applied at low temperature, in the first region, the highest temperature is $T_H$, and the lowest temperature is $T_1=T_H-(T_M/3)$; in the second region, the highest temperature is $T_1$, and the lowest temperature is $T_2=T_H-2(T_M/3)$; and in the third region, the highest temperature is $T_2$, and the lowest temperature is $T_L$, where $3° C.\le T_M/3\le 10° C.$ Therefore, the internal region of the space of the battery pack case can be better divided, and such a division manner enable the battery pack to be better adapt to the low-temperature environment.

In the present disclosure, "low temperature" refers to a temperature lower than or equal to 10° C.

The pure lithium iron phosphate system has good low-temperature discharging performance, so that the battery pack containing the pure lithium iron phosphate system is very suitable for use at the low temperature.

The compound containing at least two carbonyl groups that are conjugated with unsaturated atoms, groups or structures connected thereto has excellent electrochemical oxidation-reduction properties in a voltage range suitable for itself, and it has a relatively gentle voltage platform between 1.9 V to 2.9 V. Thus, by mixing a proper amount of the compound in a lithium iron phosphate system, the decrease of a discharging voltage of the cell can be alleviated when the voltage of the battery cell decays rapidly (below 3V) at the end of the discharging process, thereby prolonging the discharging process and improving a discharging power performance of the battery.

The circulation performance of the battery cell may deteriorate due to an excessively high or excessively low charging cut-off voltage. At an excessively high charging cut-off voltage, the battery cell may be overcharged, and a structure of the positive electrode material may be changed when continuing charging under a condition that an electric quantity of the battery cell is full, resulting in capacity loss. The oxygen released by the decomposition of the positive electrode material can violently react with the electrolyte, leading to the worst result of explosion. At an excessively low discharging cut-off voltage, the battery cell may be over-discharged, which may lead to an increase of an internal pressure of the battery cell, thereby destroying a reversibility of the positive and negative electrode active substances. The reversibility of the positive and negative electrode active substances can only be partially recovered even if it is charged, and the capacity may also be obviously attenuated. Deep charging and discharging of the battery cell can amplify the loss of the battery cell. The most ideal working state of the battery cell is shallow charging and discharging, which can prolong the service life of the battery cell.

In a battery pack including three regions, the discharging cut-off voltage of the whole first battery cell can be designed based on a specification of a conventional pure lithium iron phosphate system, that is, in a range of 1.95 V to 2.1V; the discharging cut-off voltage of the whole second battery cell can be lower than the conventional cut-off voltage, and it is optimal to allow the discharging process of the battery to bypass the voltage platform region of the low-temperature additive. In this way, no matter whether the cut-off voltage is reduced or the low-temperature additive platform plays a role, the improvement of a power performance can be ensured, and the discharging capacity difference with an inner ring battery cell caused by temperature rise can be reduced. The discharging cut-off voltage of the whole third battery cell is smaller than the discharging cut-off voltage of the whole second battery cell and higher than 1.6V In this case, it can be ensured that the discharging voltage platform of the low-temperature additive under high power can be fully exerted, fully reducing the attenuation of the voltage.

However, the discharging cut-off voltage should not be too low. If it is lower than 1.6V, a motor power of a vehicle system may be limited.

When the battery pack is practically applied at a low temperature, a temperature of an outer ring (the third region or the second region) of the battery pack is low, and a temperature of the inner ring (the first region or the second region) is high, such that the battery cells in the outer ring have shorter discharging time, smaller discharging capacity, and worse power performance. By setting a cut-off voltage of the outer ring to be lower, the battery pack can release more energy under the same condition, to make up for the difference in cell discharge of the battery pack caused by temperature rise, thereby improving the overall discharging capacity of the battery pack, and meanwhile, further improving the power and discharge performance of the battery pack.

In some embodiments, V1, V2, and V3 satisfy $0.03V \leq V1-V2 \leq 0.3V$, and $0.03V \leq V2-V3 \leq 0.3V$ In this way, through setting the discharging cut-off voltages of the first battery cell 61, the second battery cell 62 and the third battery cell 63 as described above, the energy released by the first battery cell 61, the second battery cell 62 and the third battery cell 63 at the low temperature can be substantially consistent, thereby improving the energy retention rate of the entire battery pack at the low temperature.

In some embodiments, a theoretical gram capacity of the compound, which may serve as the low-temperature additive, is in a range from 150 mAh/g to 800 mAh/g, and optionally in a range from 180 mAh/g to 600 mAh/g. In this way, by using the low-temperature additive having the theoretical gram capacity within the above range, it can be ensured that each battery cell has enough energy density, thereby improving the low-temperature discharging power of each battery cell and the overall battery pack.

In some embodiments, an overall gram capacity of the positive electrode active substance of the first battery cell ranges from 136 mAh/g to 154 mAh/g, an overall gram capacity of the positive electrode active substance of the second battery cell ranges from 133 mAh/g to 163 mAh/g, and an overall gram capacity of the positive electrode active substance of the third battery cell ranges from 128 mAh/g to 172 mAh/g.

Therefore, when the overall gram capacities of the positive electrode active substance of the first battery cell 61, the second battery cell 62, and the third battery cell 63 are respectively within the above ranges, the discharging capacities of the first battery cell 61, the second battery cell 62 and the third battery cell 63 at the low temperature can be substantially consistent, thereby improving the energy retention rate of the entire battery pack 1 at the low temperature.

Herein, the gram capacity of the positive electrode active substance of each battery cell refers to an average gram capacity of the positive electrode active substance. For example, it can be calculated based on the respective gram capacity and mass ratio of the lithium iron phosphate and the low-temperature additive contained in the positive electrode active substance.

In some embodiments, a relative molecular weight of the compound that can be used as low-temperature additive is in a range from 100 to 800.

In some embodiments, the low-temperature additive is selected from the group consisting of simple quinones, substituted quinones, quinones fused with heterocycles, polycarbonyl quinones, cyclic dianhydrides or cyclic diimides fused with unsaturated rings and salts thereof, substituted or unsubstituted six-membered rings containing 3 or 4 carbonyl groups and containing 2 or 3 atoms having lone-pair electrons, alkoxides of a six-membered ring containing 2 to 4 carbonyl groups and 1 to 2 double bonds and containing no heterocyclic atoms, and carboxylates containing a benzene ring or a double bond that is conjugated with the at least two carbonyl groups.

The simple quinones can be selected from p-benzoquinone, o-benzoquinone, naphthoquinone, anthraquinone, phenanthrenequinone, etc.

The substituted quinones may refer to the simple quinones or alkoxides of the simple quinones that are substituted by one or more, optionally at least two halogens, alkoxy groups, or hydroxy group. For example, lithium oxysalts of simple quinone or alkoxide of the simple quinone that is substituted by at least two chlorine, methoxy groups, or hydroxy groups.

The quinones fused with the heterocyclic ring may refer to p-benzoquinone or o-benzoquinone fused with a five-membered unsaturated ring or a six-membered unsaturated ring containing at least one oxygen atom, nitrogen atom, or sulfur atom.

The polycarbonyl quinones may refer to a compound fused with unsaturated 3- to 15-membered, optionally 5- to 10-membered ring containing at least two benzoquinone structures. The unsaturated ring may be a benzene ring, an unsaturated five-membered or six-membered heterocyclic ring containing N, O or S, a p-benzoquinone ring, or an o-benzoquinone ring, etc.

The cyclic dianhydrides or the cyclic diimides fused with unsaturated rings and salts thereof may refer to such compounds and salts thereof that a saturated or unsaturated five-membered ring or six-membered ring containing a dianhydride structure or a diimide structure in the ring is fused with a fused benzene ring, for example, a benzene ring or a naphthalene ring, an anthracene ring, a phenanthrene ring, or a perylene ring, etc. The salt of the cyclic dianhydrides or the cyclic diimides fused with the unsaturated ring can be selected as alkali metal salt, and optionally, lithium salt.

The substituted or unsubstituted six-membered ring containing three or four carbonyl groups and containing two or three atoms having lone-pair electrons may refer to an unsubstituted or substituted six-membered ring containing 3 carbonyl groups and three heteroatoms selected from N, O and S, an unsubstituted or substituted six-membered ring containing 4 carbonyl groups and two heteroatoms selected from N, O and S, and the substituent, when exists, can be halogen, $C_{1-6}$ alkyl, $C_{1-6}$ alkenyl, phenyl, naphthyl, or phenanthryl, etc.

In the present disclosure, halogen is selected from fluorine, chlorine, bromine, or iodine, and optionally, chlorine.

In the present disclosure, $C_{1-6}$ alkyl group may include, but is not limited to, methyl, ethyl, n-propyl, isopropyl, n-butyl, isobutyl, tert-butyl, n-pentyl, isoamyl, tert-amyl, neopentyl, n-hexyl, isohexyl, or tert-hexyl, etc.

In the present disclosure, $C_{1-6}$ alkenyl may include, but is not limited to, vinyl, propenyl, isopropenyl, n-butenyl, isobutylene, n-pentene, isopentenyl, tert-pentenyl, n-hexenyl, isohexenyl, tert-hexenyl, etc.

The alkoxides of a six-membered ring containing 2 to 4 carbonyl groups and 1 to 2 double bonds and containing no heterocyclic atoms may refer to such six-membered rings that the ring contains no heterocyclic atoms and contains 2 to 4 carbonyl groups and 1 to 2 double bonds, and the ring also contains at least two, and optionally up to 4 alkali metal oxygen groups, and optional, lithium oxygen groups.

The carboxylates containing a benzene ring or a double bond that is conjugated with at least two carbonyl groups may refer to the alkali metal salts containing at least two carboxylate groups and a benzene ring and/or a double bond connected between the two carboxylate groups, and optionally, the lithium oxygen group.

Optionally, the low-temperature additive is selected from one or more of following compounds.

(1) 1,4-dibenzoquinonyl benzene, having the following structural formula:

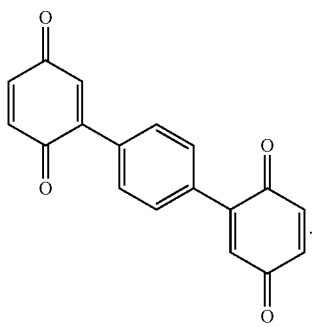 [SMILES: O=C1C=CC(=O)C(c2ccc(C3=CC(=O)C=CC3=O)cc2)=C1]

This compound has two reversible charging and discharging voltage platforms at 2.7 to 3.0 V and 2.3 to 2.5V in the discharging process, and a theoretical gram capacity is 370 mAh/g.

(2) Benzoquinone, anthraquinone, and phenanthrenequinone, having the following structural formulas and each having a theoretical gram capacity of 496 mAh/g, 257 mAh/g, and 257 mAh/g, respectively:

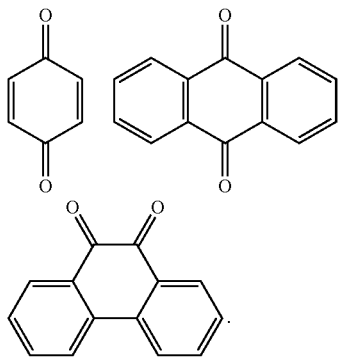

(3) 2,3,5,6-tetrachloro-1,4-benzoquinone, 2,5-dimethoxybenzoquinone, 1,3,4-trihydroxyanthraquinone, and 1,5-dilithiumoxyanthraquinone, having the following structural formulas and each having a theoretical gram capacity of 218 mAh/g, 257 mAh/g, 257 mAh/g and 212 mAh/g, respectively:

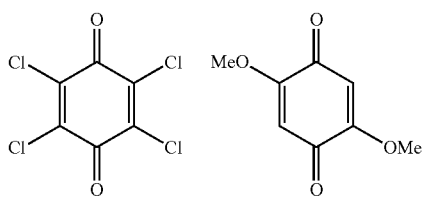

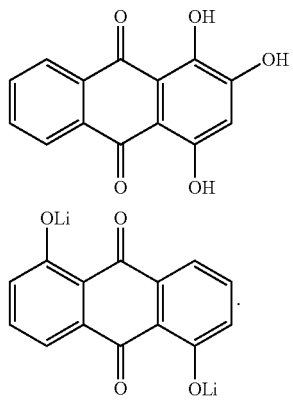

(4) Dipyrido p-benzoquinone, dipyrido o-benzoquinone, dithieno p-benzoquinone, dithieno o-benzoquinone, and difurano p-benzoquinone, having the following structural formulas and each having a theoretical gram capacity of 255 mAh/g, 255 mAh/g, 244 mAh/g, 244 mAh/g and 285 mAh/g, respectively:

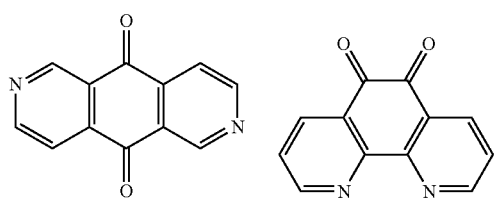

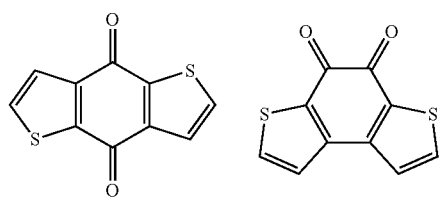

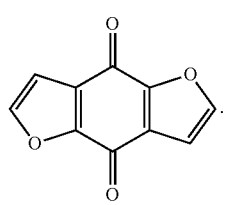

(5) Nonylbenzohexaquinone and 5,7,12,14-pentabenenet, having the following structural formulas and each having a theoretical gram capacity of 488 mAh/g and 317 mAh/g, respectively:

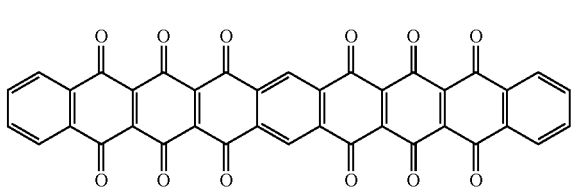

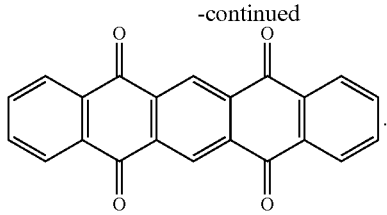

(6) Pyromellitic dianhydride, naphthalenetetracarboxylic dianhydride, and perylene tetracarboxylic dianhydride, having the following structural formulas and each having a theoretical gram capacity of 246 mAh/g, 200 mAh/g and 137 mAh/g, respectively:

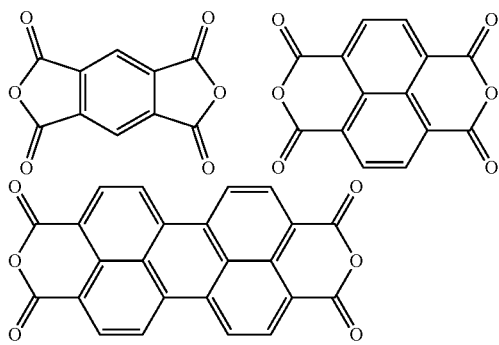

(7) Dichloroisocyanuric acid, and unsubstituted or $C_{1-6}$ alkyl- or $C_{1-6}$ alkenyl-substituted piperazine tetrone derivatives, having the following structural formulas, respectively:

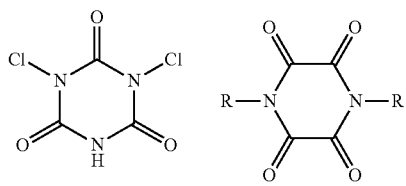

where R is H, $C_{1-6}$ alkyl, or $C_{1-6}$ alkenyl, and optionally propyl, propenyl or phenyl.

In addition, a theoretical gram capacity of the dichloroisocyanuric acid is 406 mAh/g, a theoretical gram capacity of the piperazine tetrone with R being n-propyl (PRP) is 237 mAh/g, a theoretical gram capacity of the piperazine tetrone with R being propylene (AP) is 240 mAh/g, and a theoretical gram capacity of the piperazine tetrone with R being phenyl (PHP) is 182 mAh/g.

(8) 2,5-dihydroxybenzoquinone dilithium salt, dilithium rhodizonate, and tetra-lithium rhodizonate, having the following structural formulas and each having a theoretical gram capacity of 353 mAh/g, 589 mAh/g, and 274 mAh/g, respectively:

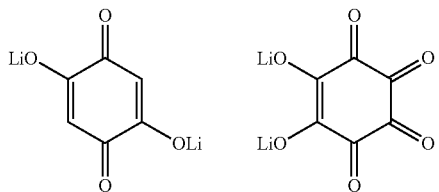

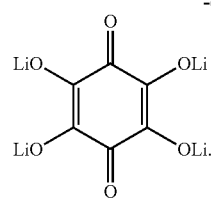

(9) Lithium terephthalate, lithium 2,4-dienyladipate, and lithium vinyl dibenzoate, having the following structural formulas and each having a theoretical gram capacity of 301 mAh/g, 348 mAh/g, and 191 mAh/g, respectively:

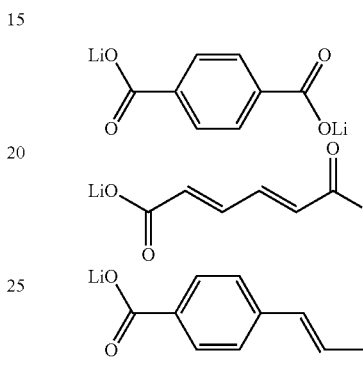

(10) Lithium diimide benzenetetracarboxylate and naphthalenetetracarboxylic acid diimide lithium salt, having the following structural formulas and each having a theoretical gram capacity of 235 mAh/g and 193 mAh/g, respectively:

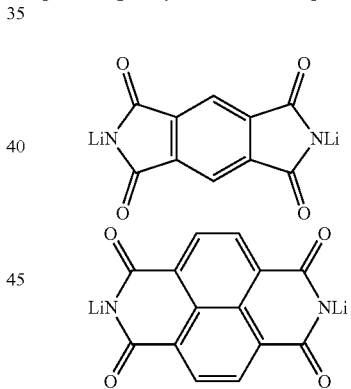

The low-temperature additive described above has a reversible charging and discharging platform, and after it partially replaces the lithium iron phosphate, it can relieve the attenuation of the voltage through an auxiliary effect of the reversible charging and discharging platform when the battery is discharged at a low SOC, thereby enhancing the discharging power performance of the cell.

In some embodiments, in the positive electrode of each of the first battery cell, the second battery cell, and the third battery cell, a mass ratio of the low-temperature additive ranges from 0% to 13%, calculated based on a total mass of the positive electrode active substance.

If the mass ratio of the low-temperature additive is greater than 13%, lithium supplementing amount in the corresponding negative electrode may be excessively great due to the excessively high mass ratio of the low-temperature additive, thereby resulting in a production safety risk.

In some alternative embodiments, in the positive electrode of the first battery cell, a mass ratio of the low-temperature additive ranges from 0% to 2%, calculated based on a total mass of the active substance, in the positive electrode of the respective second battery cell, a mass ratio of the low-temperature additive ranges from 2% to 8%, calculated based on a total mass of the active substance, and in the positive electrode of the respective third battery cell, a mass ratio of the low-temperature additive ranges from 8% to 13%, calculated based on a total mass of the active substance.

In the present disclosure, all the positive electrodes of the first battery cells in the first region may not include the low-temperature additive, or may partially include the low-temperature additive, and may include the low-temperature additive. Optionally, the mass ratio of the low-temperature additive in the positive electrode of the first battery cell is higher when the first batter cell is closer to the second region.

The first battery cell is arranged in the first region where the temperature of the battery pack is high. The first battery cell, when running at the low temperature, has relatively high discharging capacity and relatively lower requirement for low-temperature performance due to the higher temperature, thereby requiring no low-temperature additive or a small amount of the low-temperature additive.

In the second battery cell, when the mass ratio of the low-temperature additive is in the range of 2% to 8%, the discharging voltage platform of the low-temperature additive can play a role in relieving the attenuation of the voltage, thereby improving the power performance and the low-temperature retention rate of the battery pack.

Therefore, when the mass ratios of the low-temperature additive in the first battery cell, the second battery cell, and the third battery cell are within the above-mentioned ranges, the discharging time of the first battery cell, second battery cell, and third battery cell can be better balanced and kept consistent as much as possible, thereby further improving the low-temperature energy retention rate and the power performance of the overall battery pack.

In some embodiments, at the temperature below 10° C., when a sum of a discharging capacity corresponding to a discharging voltage platform of the lithium iron phosphate and a discharging capacity of a discharging voltage platform of the low-temperature additive is 100%: a discharging capacity ratio corresponding to the discharging voltage platform of the low-temperature additive of the third battery cell is greater than a discharging capacity ratio corresponding to the discharging voltage platform of the low-temperature additive of the second battery cell; and the discharging capacity ratio corresponding to the discharging voltage platform of the low-temperature additive of the second battery cell is greater than a discharging capacity ratio corresponding to the discharging voltage platform of the low-temperature additive of the first battery cell.

When three regions are divided with reference to FIG. 2, the first battery cell 61, the second battery cell 62, and the third battery cell 63 have each a discharging voltage platform of the lithium iron phosphate and a discharging voltage platform of the low-temperature additive, and an average discharging voltage of the discharging voltage platform of the lithium iron phosphate is higher than an average discharging voltage of the discharging voltage platform of the low-temperature additive. In the first battery cell 61, the second battery cell 62, and the third battery cell 63, in each case, when the sum of the discharging capacity corresponding to the discharging voltage platform of the lithium iron phosphate and the discharging capacity corresponding to the discharging voltage platform of the low-temperature additive is 100%: the discharging capacity ratio corresponding to the discharging voltage platform of the low-temperature additive of the third battery cell 63 is greater than the a discharging capacity ratio corresponding to the discharging voltage platform of the low-temperature additive of the second battery cell 62, and the discharging capacity ratio corresponding to the discharging voltage platform of the low-temperature additive of the second battery cell 62 is greater than the discharging capacity ratio corresponding to the discharging voltage platform of the low-temperature additive of the first battery cell 61. When the battery runs for a period of time in an external environment of the same temperature, in the battery pack 1, the temperature of the third region R3 is lower than the temperature of the second region R2, and the temperature of the second region R2 is lower than the temperature of the first region R1.

The phrase "discharging capacity ratio corresponding to the discharging voltage platform of the low-temperature additive" of each battery cell refers to a ratio of the discharging capacity corresponding to the discharging voltage platform of the low-temperature additive of each of the battery cells to a total discharging capacity of the discharging voltage platform of the lithium iron phosphate and the discharging voltage platform of the low-temperature additive, which are respectively measured for the first battery cell 61, the second battery cell 62 and the third battery cell 63 under the same charging-discharging conditions at a temperature of below 10° C. (e.g., −7° C.) before the first battery cell 61, the second battery cell 62, and the third battery cell 63 are assembled into the battery pack.

Figure 3:
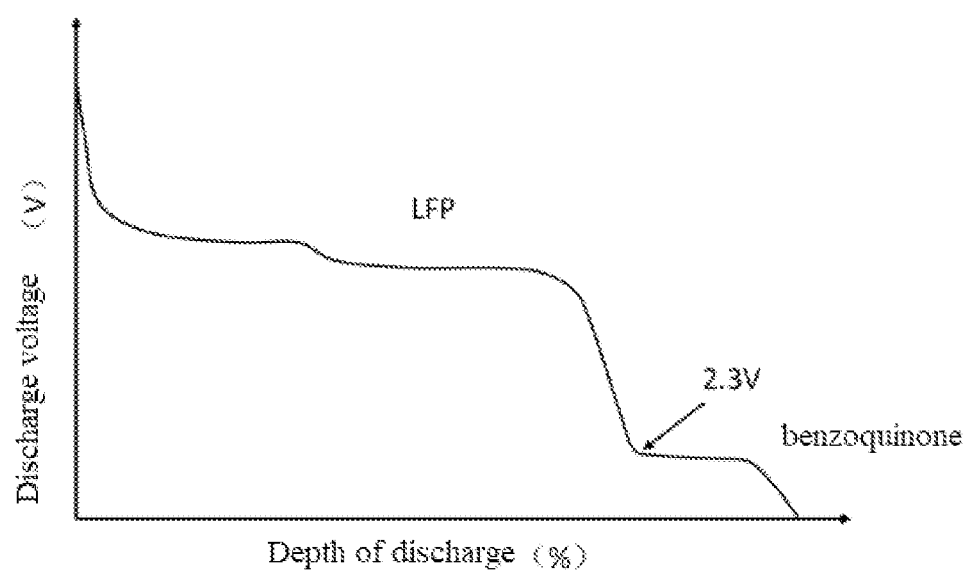
FIG. 3 is a schematic diagram of a constant-current discharging curve of a battery cell having a double-discharging voltage platform used in a battery pack according to an embodiment of the present disclosure, where a positive electrode active substance of the battery cell is composed of lithium iron phosphate (LFP) and p-benzoquinone.

It should be noted that the "discharging voltage platform" is a part of the discharging curve where the discharging voltage is relatively stable and the discharging amount per unit time is relatively large when the discharging voltage platform discharges. FIG. 3 is a schematic diagram of a constant-current discharging curve of a battery cell having a double-discharging voltage platform used in a battery pack according to an embodiment of the present disclosure at a temperature of below 10° C. (e.g., −7° C.), where a positive electrode active substance of the battery cell is composed of lithium iron phosphate (LFP) and a low-temperature additive p-benzoquinone. In addition, as illustrated in FIG. 3, when the discharging curve of the battery cell has two discharging voltage platforms, the discharging voltage drops sharply after a point of 2.3V, but the descending trend tends to be flat due to the addition of the low-temperature additive, p-benzoquinone, and the discharging continues by using the discharging voltage platform.

As illustrated in FIG. 3, a measured discharging capacity prior to the point of 2.3V can be regarded as the discharging capacity corresponding to the discharging voltage platform of the lithium iron phosphate, and a measured discharging capacity subsequent to the point of 2.3V can be regarded as the discharging capacity corresponding to the discharging voltage platform of the low-temperature additive.

In should be specially noted that, throughout the specification of the present disclosure, although the first battery cell is described as having the discharging voltage platform of the lithium iron phosphate and the discharging voltage platform of the low-temperature additive, or the positive electrode active substance of the first battery cell is described as being formed by mixing the lithium iron phosphate and the low-temperature additive, a first battery cell merely including the discharging voltage platform of the lithium iron phosphate and including no discharging voltage platform of the low-temperature additive, i.e., a first battery cell formed only by the lithium iron phosphate as the positive electrode active substance, shall also fall within the scope of the present disclosure.

The battery cells with different low-temperature energy retention rates, which have each a discharging voltage platform of the lithium iron phosphate with higher discharging voltage and a discharging voltage platform of the low-temperature additive with lower discharging voltage, are respectively disposed in different regions of the battery pack case, and the battery cells with higher low-temperature energy retention rate are disposed in the region having lower temperature. Specifically, for example, by means of a region division manner in FIG. 2, based on the temperature distribution of the interior of the battery pack when being applied at a low temperature, the temperature of the first region R1>the temperature of the second region R2>the temperature of the third region R3. In the present disclosure, the discharging capacity ratio corresponding to the discharging voltage platform of the low-temperature additive of the third battery cell 63>the discharging capacity ratio corresponding to the discharging voltage platform of the low-temperature additive of the second battery cell 62>the discharging capacity ratio corresponding to the discharging voltage platform of the low-temperature additive of the first battery cell 61. In this way, for example, at a low temperature, the third battery cell 63, as being disposed in a lower temperature environment, firstly completes the discharging by using the discharging voltage platform of lithium iron phosphate and begins the supplementary discharging by using the discharging voltage platform of the low-temperature additive. At this moment, the first battery cell and the second battery cell are still in the process of discharging by using the discharging voltage platform of the lithium iron phosphate. In this way, these three battery cells discharge together to ensure that the energy retention rate of the entire battery pack in a low-temperature environment is at a relatively high level. When the second battery cell completes the discharging by using the discharging voltage platform of lithium iron phosphate and begins the supplementary discharging by using the discharging voltage platform of the low-temperature additive, the third battery cell is still in the discharging process by using the discharging voltage platform of the low-temperature additive, and the first battery cell is still in the discharging process by using the discharging voltage platform of the lithium iron phosphate. In this way, these three battery cells still discharge together to ensure that the energy retention rate of the entire battery pack in the low-temperature environment is at a relatively high level. Therefore, by further adjusting the discharging capacity ratio corresponding to the discharging voltage platform of the low-temperature additive of each of the first battery cell, second battery cell, and third battery cell, a battery pack with higher overall low-temperature energy retention rate can be obtained, which remarkably improves the low-temperature energy retention rate of the battery pack under a low-temperature condition in winter.

It should be noted that the specific definition and test method for the discharging capacity ratio corresponding to the discharging voltage platform of the low-temperature additive of the first/second/third battery cell of the present disclosure refer to the "Performance Test" section in the specification of the present disclosure.

The discharging capacity of the discharging voltage platform of the low-temperature additive with a relatively low average discharging voltage in the battery cell can be adjusted by changing the content and types of the low-temperature additives and the ratio between various types of the low-temperature additives.

In some embodiments, when the positive electrode of each of the first battery cell, second battery cell, and third battery cell includes the same positive electrode active substance, a mass ratio of the low-temperature additive in the positive electrode of the first battery cell≤a mass ratio of the low-temperature additive in the positive electrode of the second battery cell≤a mass ratio of the low-temperature additive in the positive electrode of the third battery cell. Optionally, the mass ratio of the low-temperature additive in the positive electrode of the first battery cell<the mass ratio of the low-temperature additive in the positive electrode of the second battery cell<the mass ratio of the low-temperature additive in the positive electrode of the third battery cell. The mass ratio of the low-temperature additive is calculated based on a total mass of the positive electrode active substance.

When the same low-temperature additive is used in each battery cell, with an increase in the mass ratio of the low-temperature additive, the discharging voltage platform of which is used for generating a lower discharging voltage, the discharging capacity ratio corresponding to the discharging voltage platform of the low-temperature additive is increased, and the low-temperature energy retention rate of the battery cell is enhanced.

For example, when the positive electrode in each of the first battery cell, second battery cell, and third battery cell uses the same type of positive electrode active substance, by setting the mass ratio of the low-temperature additive of the third battery cell 63 arranged in the third region R3≥the mass ratio of the low-temperature additive of the second battery cell 62 arranged in the second region R2≥the mass ratio of the low-temperature additive of the first battery cell 61 arranged in the first region R1, it can achieve that the low-temperature energy retention ratio of the third battery cell 63≥the low-temperature energy retention ratio of the second battery cell 62≥the low-temperature energy retention rate of the first battery cell 61. In this way, the energy released by the first battery cell 61, the second battery cell 62 and the third battery cell 63 at a low temperature is substantially consistent, thereby improving the energy retention rate of the entire battery pack 1 at the low temperature.

In some embodiments, at a room temperature, optionally, at 25° C.: the discharging capacity of the single cell of the first battery cell>the discharging capacity of the single cell of the second battery cell>the discharging capacity of the single cell of the third battery cell.

In the present disclosure, the respective constituent units of the first battery cell, the second battery cell, and the third battery cell are referred to as "single cells".

As illustrated in FIG. 2, the discharging capacity of the single cell of the third battery cell 63<the discharging capacity of the single cell of the second battery cell 62<the discharging capacity of the single cell of the first battery cell 61. That is, optionally, "the discharging capacity of the single cell of the first battery cell 61", "the discharging capacity of the single cell of the second battery cell 62", and "the discharging capacity of the single cell of the third battery cell 63" refer to the discharging capacities respectively measured for the single cell of the first battery cell 61, the single cell of the second battery cell 62, and the single cell of the third battery cell 63 under the same charging-discharging condition at the room temperature such as 25° C. before the first battery cell 61, the second battery cell 62, and the third battery cell 63 are assembled into the battery pack.

In this way, by enabling the discharge capacities of the respective single cells of the first battery cell 61, the second battery cell 62 and the third battery cell 63 to satisfy the above relationship, in particular, by enabling the discharging capacity of the first battery cell 61, the second battery cell 62 and the third battery cell 63 measured at a room temperature to satisfy the above relationship, the energy retention rate of the entire battery pack at a low temperature can be further improved.

In some alternative embodiments, a negative electrode of each battery cell is a graphite negative electrode.

In some optional embodiments of the present disclosure, when using the low-temperature additive containing no lithium or a small amount of lithium, the negative electrode of each of the first battery cell 61, the second battery cell 62, and the third battery cell 63 can be subjected to lithium supplementing treatment, or the low-temperature additive can subject to a pre-lithiation before preparing the positive electrode plate, thereby reducing the capacity loss caused by the addition of the low-temperature additive. In this way, by performing lithium supplementing treatment on the negative electrode of each of the first battery cell 61, the second battery cell 62, and the third battery cell 63, insufficiency of lithium ions caused by adding the low-temperature additive into the positive electrode active substance can be made up, so that a total amount of effective lithium ions of the battery cell is not reduced, thereby ensuring the energy density of the battery cell.

The method for lithium supplementing treatment on the negative electrode can be any of various known methods. For example, a following method can be adopted: lithium is supplied to the coated and cold-pressed negative electrode plate through a lithium supplementing device. A lithium strip conveying structure in the device is used for conveying a lithium strip, a substrate conveying structure is used for conveying the negative electrode plate. The lithium strip and the negative electrode plate are rolled, and after rolling, the lithium strip is attached to a surface of the negative electrode plate, thereby finishing the pre-supplementing-lithium of the negative electrode. A first efficiency of the battery can be improved by the pre-supplementing-lithium of the negative electrode active substance or the negative electrode supplementing-lithium. A specific device and a method for negative electrode supplementing-lithium can refer to the Patent Application CN 207558931 U, the content of which is incorporated herein by reference.

At least one of the negative electrode supplementing-lithium and pre-supplementing-lithium of the negative electrode active substance may be performed.

In the present disclosure, the number of the battery cells is not limited, which can be determined according to the factors such as application scenes, temperature distribution determined according to simulation and other methods, and battery pack techniques.

A second aspect of the present disclosure provides a method for arranging a battery pack including a battery pack case and battery cells accommodated in the battery pack case. The method includes: step 1 of determining, based on a simulation method, a temperature distribution in entire internal space of the battery pack case when being applied at a low temperature; step of dividing, based on the temperature distribution determined in the step 1, the internal space of the battery pack case into three regions in a descending order of temperature; step 3 of arranging a first battery cell in the first region, arranging a second battery cell in the second region, and arranging a third battery cell in the third region, allowing the first battery cell and the second battery cell to be arranged adjacent to each other, and the second battery cell and the third battery cell to be arranged adjacent to each other; and step 4 of designing a discharging cut-off voltage of the battery pack at a temperature of 10° C. and below based on following rules: a discharging cut-off voltage V1 of the first battery cell of the first region ranges from 1.95V to 2.1V, a discharging cut-off voltage V2 of the second battery cell in the second region ranges from 1.8V to 2.0V, a discharging cut-off voltage V3 of the third battery cell in the third region ranges from 1.6 V to 1.9V, and V1, V2, and V3 satisfy a relationship of V1>V2>V3, and optionally, $0.03V \leq V1-V2 \leq 0.3V$, and $0.03V \leq V2-V3 \leq 0.3V$. The internal space of the battery pack case includes one or more first regions, second regions, and/or third regions. A positive electrode of each of the first battery cell, the second battery cell, and the third battery cell includes a positive electrode active substance. The positive electrode active substance is composed of lithium iron phosphate and a low-temperature additive. The low-temperature additive is selected from one or more of compounds containing at least two carbonyl groups, which are respectively conjugated with a double bond, an unsaturated monocyclic ring or unsaturated fused ring, an unsaturated group, and an atom having lone-pair electrons connected thereto.

Electrical Device

A third aspect of the present disclosure provides an electrical device including the battery pack according to the first aspect of the present disclosure. The battery pack can be used as a power supply of the electrical device and can also be used as an energy storage unit of the electrical device. The electrical device may include a mobile device (such as a mobile phone, a notebook computer, etc.), an electric vehicle (such as a pure electric vehicle, a hybrid electric vehicle, a plug-in hybrid electric vehicle, an electric bicycle, an electric scooter, an electric golf cart, an electric truck, etc.), an electric train, a ship, a satellite, an energy storage system, etc., but it is not limited thereto.

For the electrical device, the battery cell or the battery pack can be selected according to its use requirements.

Figure 4:
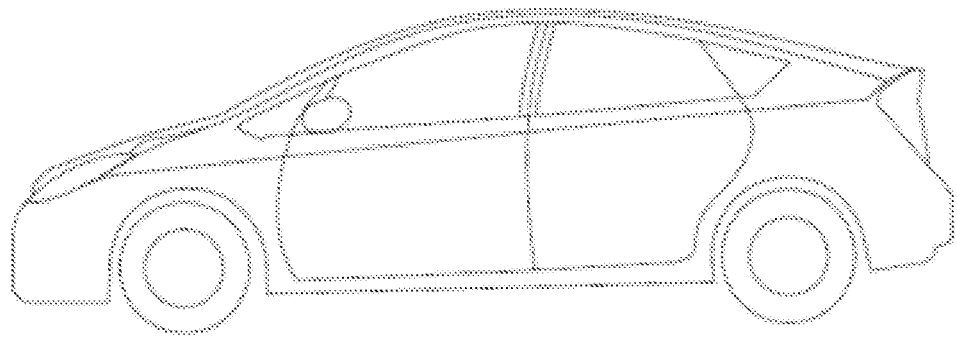
FIG. 4 is a schematic diagram of an electrical device using a battery pack according to an embodiment of the present disclosure as a power supply.

FIG. 4 is an example of an electrical device. The electrical device may be a pure electric vehicle, a hybrid electric vehicle, or a plug-in hybrid electric vehicle, etc. In order to meet the requirement of the electrical device for an endurance at a low temperature, the battery pack of the present disclosure can be used.

EXAMPLES

The embodiments of the present disclosure are described below. The embodiments described below are exemplary and are only used for explaining the present disclosure, and they cannot be understood as limitations of the present disclosure. Specific techniques or conditions, which are not specified in the embodiments, are carried out in accordance with techniques or conditions described in literature in the related art or in accordance with product specification. The reagents or instruments used without specifying manufacturers are all conventional products which are commercially available.

Example 1

I. Preparation of a Battery Cell
1. Preparation of a First Battery Cell
1) Preparation of a Positive Electrode Plate A first positive electrode active substance, lithium iron phosphate (LFP), serving as a positive electrode active substance, a low-temperature additive, superconducting carbon black SP serving as a conductive agent, and polyvinylidene fluoride (PVDF) serving as a binder were dispersed in N-methyl pyrrolidone (NMP) serving as a solvent, and mixed uniformly to obtain positive electrode slurry. The positive electrode slurry was coated uniformly on an aluminum foil of a positive electrode current collector, followed by drying, cold pressing, slitting and cutting, to obtain the positive electrode plate.

A mass ratio of the positive electrode active substance to the superconducting conductive carbon black to the binder PVDF is 96:2:2, and a mass ratio of the low-temperature additive to the first positive electrode active substance (LFP) is 5:95.

2) Preparation of the Negative Electrode Plate

Graphite as a negative electrode active substance, superconducting carbon black SP serving as a conductive agent, SBR serving as a binder, and CMC-Na serving as a thickener were dispersed in deionized water serving as a solvent according to a mass ratio of 96:1:1:2, and mixed uniformly to obtain negative electrode slurry. The negative electrode slurry was coated uniformly on a copper foil of a negative electrode current collector, followed by drying, cold pressing, slitting and cutting, to obtain the negative electrode plate was obtained.

A lithium supplementing process of the negative electrode: lithium was supplied to the coated and cold-pressed negative electrode plate through a lithium supplementing device. A lithium strip conveying structure in the device is used for conveying a lithium strip, a substrate conveying structure is used for conveying the negative electrode plate, the lithium strip and the negative electrode plate are rolled, and after rolling, the lithium strip is attached to a surface of the negative electrode plate, so that the pre-supplementing lithium of the negative electrode was completed.

3) Separator

A polyethylene film was selected as the separator.

4) Preparation of Electrolyte

Ethylene carbonate (EC), dimethyl carbonate (DMC), and diethyl carbonate (DEC) were uniformly mixed according to a volume ratio of 1:1:1 to obtain an organic solvent, and then the fully dried lithium salt $LiPF_6$ was dissolved in the mixed organic solvent, to prepare an electrolyte with a concentration of 1 mol/L.

5) Preparation of a Battery Cell

The positive electrode plate, the separator, and the negative electrode plate were stacked in sequence in such a manner that the separator was located between the positive electrode plate and the negative electrode plate to play a separation role, and they were then wound to obtain a bare cell. The bare cell was arranged in a packaging shell, and after drying, the electrolyte was injected, followed by the procedures such as vacuum packaging, standing, formation, and shaping, to obtain a first battery cell I-1.

2. Preparation of a Second Battery Cell and a Third Battery Cell

The second battery cell and the third battery cell were prepared in substantially the same way as the first battery cell, and the differences can be referred to Table 1.

II. Assembly of a Battery Pack

Based on a simulation method, an internal space of a battery pack case was divided into three regions using an ANSYS-SCDM software. The specific operation was as follows.

(1) A battery low-temperature working condition test was performed, and during this process, a current magnitude, a battery resistance and working condition process parameters were recorded.

(2) A three-dimensional structure digital model of a battery pack, a material heat conduction coefficient, a water-cooling system structure, a water-cooling flow speed, and a water-cooling temperature were input in the ANSYS-SCDM software, to calculate heat production and heat dissipation balance of an interior of the battery pack, thereby obtaining temperature distributions at different time and different positions.

It is determined based on the above-mentioned method that an external temperature was set as −7° C., the highest temperature of a first region was 18° C., the lowest temperature of the first region was 12° C., the highest temperature of a second region was 12° C., the lowest temperature of the second region was 6° C., the highest temperature of a third region was 6° C., and the lowest temperature of the third region was 0° C.

Referring to FIG. 2, the first battery cell I-1 is disposed in the first region R1 as the first battery cell 61, the second battery cell II-1 is disposed in the second region R2 to serve as the second battery cell 62, and the third battery cell III-1 is disposed in the third region R3 to serve as the third battery cell 63, thereby assembling the battery pack. The number of the first battery cells 61: the number of the second battery cells 62: the number of the third battery cells 63=12:32:40.

At a low temperature (for example, a test temperature −7° C.), a cut-off voltage of the whole first battery cell is designed to be 2.0V, a cut-off voltage of the whole second battery cell is designed to be 1.9V, and a cut-off voltage of the whole third battery cell is designed to be 1.8V.

[Example 1 to Example 11] and [Comparative Example 1 to Comparative Example 2]

These examples are prepared in substantially the same way as Example 1, and the differences can be referred to Table 1.

[Performance Test]

1. Discharging capacity of the single cell and discharging capacity ratio corresponding to the discharging voltage platform of the low-temperature additive.

For the first battery cell, the second battery cell, and the third battery cell in the respective battery packs prepared in the examples and the comparative examples, using a Xinwei Power Battery Testing Machine (Model BTS-5V300A-4CH), the discharging capacities of the first battery cell, second battery cell, and third battery cell at 25° C. and −7° C., and the discharging capacity corresponding to the discharging voltage platform of the lithium iron phosphate and the discharging capacity corresponding to the discharging voltage platform of the low-temperature additive at −7° C. were measured, respectively, and then the discharging capacity ratios corresponding to the discharging voltage platform of the low-temperature additive of the first battery cell, second battery cell, and third battery cell were calculated, respectively.

The discharging capacity of the battery cell was measured by a method including the following steps: (1) leaving the battery cell to stand for 2 hours at 25° C., to ensure a temperature of the battery cell at 25° C.; (2) after charging the battery cell to 3.65V at 0.33C at 25° C., continuously carrying out constant-voltage charging at this voltage, until a current is 0.05C, cutting off the charging (where C represents a rated capacity of the battery cell); (3) leaving the battery cell to stand for 1 hour at 25° C.; (4) discharging the battery cell to 2.5V at 0.33C at 25° C., and recording a total discharging capacity C0 released by the battery cell; (5) leaving the battery cell to stand for 2 hours at 25° C., to ensure that the temperature of the battery cell is 25° C.; (6) after charging the battery cell to 3.65V at 0.33C at 25° C., continuously carrying out constant-voltage charging at this voltage, until the current is 0.05C, cutting off the charging (where C represents the rated capacity of the battery cell); (7) leaving the battery cell to stand for 2 hours at −7° C.; (8) discharging the battery cell to 2.0V at 0.33C at −7° C., and recording a discharging capacity C1 released by the battery cell; and (9) obtaining a discharging curve in the step (8), for example, the discharging curve as illustrated in FIG. 3 of the present disclosure. In the discharging curve of FIG. 3, a total discharging capacity before the 2.3V point is a discharging capacity C2 corresponding to a discharging voltage platform of the lithium iron phosphate, and a discharging capacity from the 2.3V point to the discharging cut-off voltage is a discharging capacity C3 corresponding to the discharging voltage platform of the low-temperature additive.

Therefore, at −7° C., a discharging capacity proportion corresponding to the discharging voltage platform of the low-temperature additive of the battery cell is equal to C3/C1.

The discharging capacity of the single cell in Table 1 below is the total discharging capacity C0 of the battery cell measured at 25° C. in the step (4).

2. Total energy retention rate of the battery pack at −7° C.

For the respective battery pack prepared in the examples and the comparative examples, using a Xinwei Power Battery Testing Machine (Model BTS-5 V300A-4 CH), a total full discharging energy of the battery pack at 25° C. and the total full discharging energy of the battery pack at −7° C. were measured respectively, and the total energy retention rate (%) of the battery pack at −7° C. was calculated by dividing the total full discharging energy of the battery pack at −7° C. by the total full discharging energy of the battery pack at 25° C.

The measurement of the total full discharging energy of the battery pack at 25° C. was carried out according to "7.1.2 Test of Capacity and Energy at a Room Temperature" in "GBT 31467.2-2015, High Energy Application Test Procedures of Battery Pack and System".

The measurement of the total full discharging energy of the battery pack at −7° C. was carried out according to "7.1.4 Test of Capacity and Energy at Low Temperature" in "GBT 31467.2-2015, High Energy Application Test Procedures of Battery Pack and System". The total full discharging energy of the battery pack at −7° C. is the discharging energy of the battery pack at −7° C. in Table 1.

Test results are illustrated in following tables.

TABLE 1

| Example | Battery cell | Active substance (weight %) | Cut-off voltage/V | Discharging capacity ratio of second discharging voltage platform at −7° C. | Discharging capacity of single cell (25° C.)/Ah | Total energy retention rate of battery pack at −7° C. |
|---|---|---|---|---|---|---|
| Example 1 | first battery cell | 100% lithium iron phosphate | 2 | 0.0% | 192.50 | 94.30% |
|  | second battery cell | 94.5% lithium iron phosphate + 5.5% 1,4-dibenzoquinonyl benzene | 1.9 | 3.50% | 188.85 |  |
|  | third battery cell | 89.5% lithium iron phosphate + 10.5% 1,4-dibenzoquinonyl benzene | 1.8 | 6.90% | 185.00 |  |
| Example 2 | first battery cell | 100% lithium iron phosphate | 2 | 0.0% | 192.50 | 92.50% |
|  | second battery cell | 94.5% lithium iron phosphate + 5.5% pyromellitic dianhydride | 1.9 | 1.9% | 188.26 |  |
|  | third battery cell | 89.5% lithium iron phosphate + 10.5% pyromellitic dianhydride | 1.8 | 4.0% | 184.44 |  |
| Example 3 | first battery cell | 100% lithium iron phosphate | 2 | 0.0% | 192.50 | 93.70% |
|  | second battery cell | 94.5% lithium iron phosphate + 5.5% dipyrido benzoquinone | 1.9 | 2.1% | 187.77 |  |
|  | third battery cell | 89.5% lithium iron phosphate + 10.5 dipyrido benzoquinone | 1.8 | 4.4% | 183.80 |  |
| Example 4 | first battery cell | 100% lithium iron phosphate | 2 | 0.0% | 192.50 | 94.80% |
|  | second battery cell | 94.5% lithium iron phosphate + 5.5 nonbenzohexaquinone | 1.9 | 4.1% | 194.54 |  |
|  | third battery cell | 89.5% lithium iron phosphate + 10.5% nonbenzohexaquinone | 1.8 | 7.8% | 197.04 |  |
| Example 5 | first battery cell | 100% lithium iron phosphate | 2 | 0.0% | 192.50 | 94.00% |
|  | second battery cell | 94.5% lithium iron phosphate + 5.5% lithium terephthalate | 1.9 | 3.1% | 186.62 |  |
|  | third battery cell | 89.5% lithium iron phosphate + 10.5% lithium terephthalate | 1.8 | 5.7% | 180.97 |  |
| Example 6 | first battery cell | 100% lithium iron phosphate | 2 | 0.0% | 192.50 | 85.40% |
|  | second battery cell | 94.5% lithium iron phosphate + 5.5% 1,4-dibenzoquinonyl benzene | 1.9 | 3.5% | 188.85 |  |

TABLE 1-continued

| Example | Battery cell | Active substance (weight %) | Cut-off voltage/V | Discharging capacity ratio of second discharging voltage platform at −7° C. | Discharging capacity of single cell (25° C.)/Ah | Total energy retention rate of battery pack at −7° C. |
|---|---|---|---|---|---|---|
| Example 8 | first battery cell | 100% lithium iron phosphate | 2 | 0.0% | 192.50 | 83.2% |
| | second battery cell | 100% lithium iron phosphate | 1.9 | 0.0% | 192.50 | |
| | third battery cell | 100% lithium iron phosphate | 1.8 | 0.0% | 192.50 | |
| Example 9 | first battery cell | 100% lithium iron phosphate | 1.8 | 0.0% | 192.50 | 92.6% |
| | second battery cell | 94.5% lithium iron phosphate + 5.5% 1,4-dibenzoquinonyl benzene | 1.9 | 3.50% | 188.85 | |
| | third battery cell | 89.5% lithium iron phosphate + 10.5% 1,4-dibenzoquinonyl benzene | 2 | 6.90% | 185.00 | |
| Example 10 | first battery cell | 100% lithium iron phosphate | 2 | 0.0% | 192.50 | 93.1% |
| | second battery cell | 94.5% lithium iron phosphate + 5.5% 1,4-dibenzoquinonyl benzene | 1.8 | 3.50% | 188.85 | |
| | third battery cell | 89.5% lithium iron phosphate + 10.5% BQ | 1.9 | 6.90% | 185.00 | |
| Example 11 | first battery cell | 100% lithium iron phosphate | 1.9 | 0.0% | 192.50 | 92.9% |
| | second battery cell | 94.5% lithium iron phosphate + 5.5% 1,4-dibenzoquinonyl benzene | 2 | 3.50% | 188.85 | |
| | third battery cell | 89.5% lithium iron phosphate + 10.5% 1,4-dibenzoquinonyl benzene | 1.8 | 6.90% | 185.00 | |
| Comparative Example 1 | first battery cell | 100% lithium iron phosphate | 2 | 0.0% | 192.50 | 79.3% |
| | second battery cell | 100% lithium iron phosphate | 2 | 0.0% | 192.50 | |
| | third battery cell | 100% lithium iron phosphate | 2 | 0.0% | 192.50 | |
| Comparative Example 2 | first battery cell | 100% lithium iron phosphate | 2 | 0.0% | 192.50 | 92.4% |
| | second battery cell | 94.5% lithium iron phosphate + 5.5% 1,4-dibenzoquinonyl benzene | 2 | 3.5% | 188.85 | |
| | third battery cell | 89.5% lithium iron phosphate + 10.5% 1,4-dibenzoquinonyl benzene | 2 | 6.9% | 185.00 | |

As can be seen from results of the above table, compared with Comparative Example 1 and Comparative Example 2, in Example 1 to Example 11, when the cut-off voltage V1 of the first battery cell in the range from 1.95V to 2.1V is greater than the cut-off voltage V2 of the second batter cell in the range from 1.8V to 2.0V and greater than the cut-off voltage V2 of the third battery cell in the range from 1.6V to 1.9V, especially when 0.03V≤V1−V2≤0.3V and 0.03V≤V2−V3≤0.3V; at a temperature below −7° C., when the sum of the discharging capacity corresponding to the discharging voltage platform of the lithium iron phosphate and the discharging capacity corresponding to the discharging voltage platform of the low-temperature additive is 100%: the discharging capacity ratio corresponding to the discharging voltage platform of the low-temperature additive of the third battery cell>the discharging capacity ratio corresponding to the discharging voltage platform of the low-temperature additive of the second battery cell>discharging capacity ratio corresponding to the discharging voltage platform of the low-temperature additive of the second battery cell is greater than the discharging capacity ratio corresponding to the discharging voltage platform of the low-temperature additive of the first battery cell; at 25° C., the discharging capacity of the single cell of the first battery cell>the discharging capacity of the single cell of the second battery>the discharging capacity of the single cell of the third battery cell; and the total energy retention rate of the battery pack at a low temperature is relatively high.

It should be noted that the present disclosure is not limited to the above-mentioned embodiments. The above embodiments are merely illustrative, and embodiments having substantially the same composition as that of technical ideas and playing the same effect in the range of the technical solution of the present disclosure shall all included in the technical scope of the present disclosure. In addition, without departing from the spirit of the present disclosure, various modifications which are applied to the embodiments and can be conceived of by those skilled in the art, and other manners constructed by combining part of the components in the embodiments are also included within the scope of the present disclosure.

What is claimed is:

1. A battery pack, comprising:
a battery pack case; and
battery cells accommodated in the battery pack case; wherein:
based on a determined temperature distribution across an internal space of the battery pack case, the internal space of the battery pack case comprises a first region, a second region, and a third region in a descending order of temperature;
a first battery cell is arranged in the first region, a second battery cell is arranged in the second region, a third battery cell is arranged in the third region, the first battery cell and the second battery cell are arranged adjacent to each other, and the second battery cell and the third battery cell are arranged adjacent to each other;
the internal space of the battery pack case comprises one or more first regions, second regions, and/or third regions;
a positive electrode of each of the first battery cell, the second battery cell, and the third battery cell comprises a positive electrode active substance, the positive electrode active substance including lithium iron phosphate and a low-temperature additive, the low-temperature additive being selected from one or more of compounds containing at least two carbonyl groups that are respectively or jointly conjugated with a double bond, an unsaturated monocyclic ring or unsaturated fused ring, an unsaturated group, and an atom having lone-pair electrons connected thereto;
at external temperatures of 10° C. and below, a discharging cut-off voltage V1 of the first battery cell in the first region ranges from 1.95V to 2.1V, a discharging cut-off voltage V2 of the second battery cell in the second region ranges from 1.8V to 2.0V, a discharging cut-off voltage V3 of the third battery cell in the third region ranges from 1.6V to 1.9V, and V1, V2, and V3 satisfy a relationship of V1>V2>V3;
a temperature difference TM between a highest temperature TH and a lowest temperature $T_L$ across the internal space of the battery pack case is greater than or equal to 3° C.; and
a highest temperature in the second region is lower than or equal to a lowest temperature in the first region, and a highest temperature in the third region is lower than or equal to a lowest temperature in the second region.

2. The battery pack according to claim 1, wherein:

$0.03V \leq V1-V2 \leq 0.3V$, and $0.03V \leq V2-V3 \leq 0.3V$.

3. The battery pack according to claim 1, wherein the compound has a theoretical gram capacity in a range from 150 mAh/g to 800 mAh/g.

4. The battery pack according to claim 1, wherein the compound has a relative molecular weight ranging from 100 to 800.

5. The battery pack according to claim 1, wherein:
an overall gram capacity of the positive electrode active substance of the first battery cell ranges from 136 mAh/g to 154 mAh/g;
an overall gram capacity of the positive electrode active substance of the second battery cell ranges from 133 mAh/g to 163 mAh/g; and
an overall gram capacity of the positive electrode active substance of the third battery cell ranges from 128 mAh/g to 172 mAh/g.

6. The battery pack according to claim 1, wherein the low-temperature additive is selected from the group consisting of simple quinones, substituted quinones, quinones fused with heterocycles, polycarbonyl quinones, cyclic dianhydrides or cyclic diimides fused with unsaturated rings and salts thereof, substituted or unsubstituted six-membered rings containing 3 or 4 carbonyl groups and 2 or 3 atoms having lone-pair electrons, alkoxides of a six-membered ring containing 2 to 4 carbonyl groups and 1 to 2 double bonds and containing no heterocyclic atoms, and carboxylates containing a benzene ring or a double bond that is conjugated with the at least two carbonyl groups.

7. The battery pack according to claim 1, wherein based on the determined temperature distribution across the internal space of the battery pack case when being applied at the low temperature, for the first region, the second region, and the third region, a difference between a highest temperature and a lowest temperature in a same region is greater than or equal to 3° C.

8. The battery pack according to claim 1, wherein:
in the first region, the highest temperature is $T_H$, and the lowest temperature is $T_1=T_H-(T_M/3)$;
in the second region, the highest temperature is $T_1$, and the lowest temperature is $T_2=T_H-2(T_M/3)$; and
in the third region, the highest temperature is $T_2$, and the lowest temperature is $T_L$, where 3° C.$\leq T_M/3 \leq$10° C.

9. The battery pack according to claim 1, wherein:
in the positive electrode of the first battery cell, a mass ratio of the low-temperature additive ranges from 0% to 2%, calculated based on a total mass of the active substance;
in the positive electrode of the respective second battery cell, a mass ratio of the low-temperature additive ranges from 2% to 8%, calculated based on a total mass of the active substance; and
in the positive electrode of the respective third battery cell, a mass ratio of the low-temperature additive ranges from 8% to 13%, calculated based on a total mass of the active substance.

10. The battery pack according to claim 1, wherein, when the positive electrode of each of the first battery cell, second battery cell, and third battery cell comprises a same positive electrode active substance:
a mass ratio of the low-temperature additive in the positive electrode of the first battery cell≤a mass ratio of the low-temperature additive in the positive electrode of the second battery cell≤a mass ratio of the low-temperature additive in the positive electrode of the third battery cell, the mass ratio of the low-temperature additive being calculated based on a total mass of the positive electrode active substance.

11. The battery pack according to claim 1, wherein, at an external temperature below 10° C., when a sum of a discharging capacity corresponding to a discharging voltage platform of the lithium iron phosphate and a discharging capacity of a discharging voltage platform of the low-temperature additive is 100%:
a discharging capacity ratio corresponding to the discharging voltage platform of the low-temperature additive of the third battery cell is greater than a discharging capacity ratio corresponding to the discharging voltage platform of the low-temperature additive of the second battery cell; and the discharging capacity ratio corresponding to the discharging voltage platform of the low-temperature additive of the second battery cell is greater than a discharging capacity ratio corresponding to the discharging voltage platform of the low-temperature additive of the first battery cell.

12. The battery pack according to claim 1, wherein, at a room temperature:

a discharging capacity of a single cell of the first battery cell>a discharging capacity of a single cell of the second battery cell>a discharging capacity of a single cell of the third battery cell.

13. An electrical device, comprising the battery pack according to claim 1.

14. A method for arranging the battery pack according to claim 1, the method comprising:

determining, based on a simulation method, the temperature distribution across the internal space of the battery pack case;

dividing, based on the temperature distribution, the internal space of the battery pack case into the three regions in the descending order of temperature;

arranging the first battery cell in the first region, arranging the second battery cell in the second region, and arranging the third battery cell in the third region, allowing the first battery cell and the second battery cell to be arranged adjacent to each other, and the second battery cell and the third battery cell to be arranged adjacent to each other; and designing a discharging cut-off voltage of the battery pack at the external temperature of 10° C. and below based on following rules: the discharging cut-off voltage V1 of the first battery cell of the first region ranges from 1.95V to 2.1V, the discharging cut-off voltage V2 of the second battery cell in the second region ranges from 1.8V to 2.0V, the discharging cut-off voltage V3 of the third battery cell in the third region ranges from 1.6 V to 1.9V, and V1, V2, and V3 satisfy the relationship of V1>V2>V3.

* * * * *